Patented Oct. 30, 1951

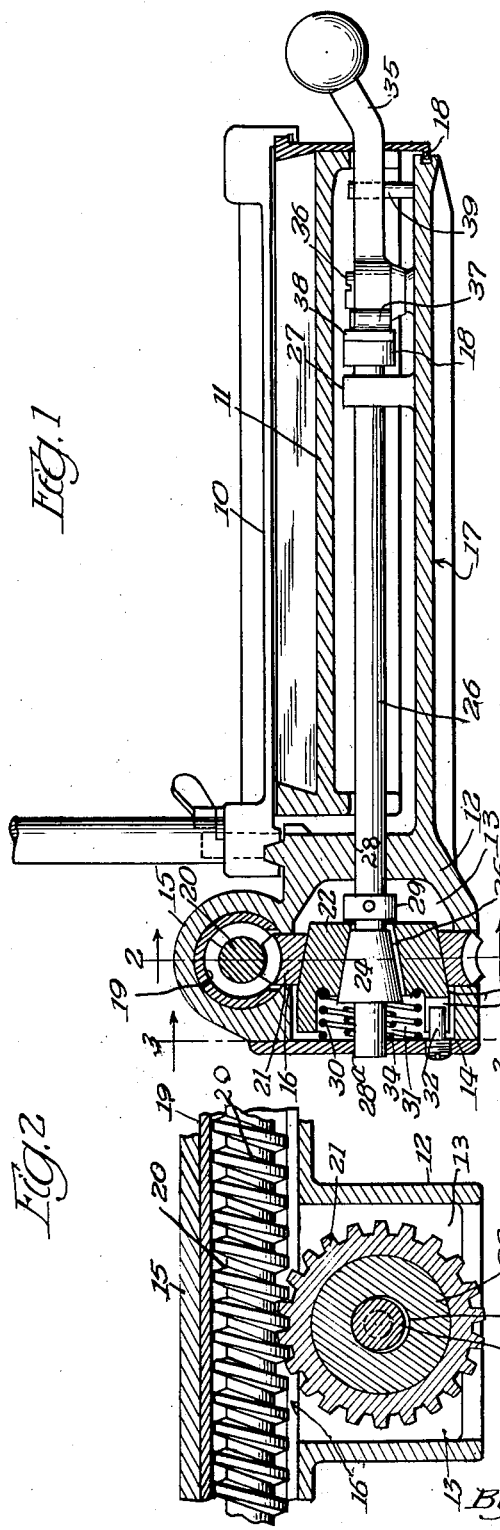

2,573,628

UNITED STATES PATENT OFFICE 2,573,628

SLICING MACHINE FEED MECHANISM

Adrianus van Duyn, Hillegersberg, Netherlands, assignor to U. S. Slicing Machine Company, Inc., a corporation of Indiana Application March 1, 1947, Serial No. 731,765
In Great Britain March 29, 1946

10 Claims. (Cl. 146—102)

This invention relates, in general, to slicing machines, of the type embodying a feed table or substance carrier which carries the substance to be sliced, and which is adapted to be advanced intermittently towards the knife of the machine, by means of a feed screw and a co-operating screw follower, which is connected with the substance carrier so as to move or advance therewith.

Heretofore, in machines of this type, the screw follower has usually been in the form of a feed nut in the shape of what is generally known as a saddle or half nut, embodying a segmental screw member that rests upon and meshes with the feed screw. By actuating the feed screw, the substance carrier is fed toward the slicing plane, and may be withdrawn from it. By disengaging the nut from the feed screw, the operator is enabled to withdraw the substance carrier freely, by pulling it, and he may also freely advance the carrier by pushing it.

It has been found, however, with such a nut, that when it is disengaged from the screw to permit free movement of the substance carrier, the feed nut does not readily move into mesh again with the screw for the next feeding operation, and at such times some manipulation of the feed screw, or of the substance carrier, is necessary in order to position the feed nut into proper mesh with the screw.

To overcome these difficulties and inconveniences, and to provide a feeding structure of this character, in which the screw follower is maintained in mesh with the feed screw not only during movement of the substance carrier by the feed screw, but also when the carrier is freed for movement independently of the feed screw, is one of the objects of the present invention.

Another object is to provide an improved slicing machine of this type, in which the screw follower is in the form of a worm wheel, which is held against rotation so as to act as a feed-nut for movement of the substance carrier by the feed screw, and which is freed so as to be rotated idly by the feed screw when the substance carrier is moved independently with respect to the feed screw.

A further object is to provide improved means for maintaining the screw follower or nut in mesh with the feed screw, whereby the screw follower will be prevented from receding from full engagement with the feed screw.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawing illustrating this invention, in which Fig. 1 is a vertical transverse sectional view, partly in elevation, and with parts omitted, of a feeding mechanism constructed in accordance with the principles of this invention.

Fig. 2 is an irregular sectional view on line 2—2, Fig. 1.

Fig. 3 is a rear elevational view of the clutch member, with parts omitted.

Fig. 4 is a detail sectional view of the clutch mechanism, showing the clutch in releasing position with respect to the feed nut.

Fig. 5 is a detail plan view of the clutch control lever.

In the drawing, the invention is shown as applied to a machine which embodies a feed table, generally designated by the numeral 10, which is detachably secured to a component part, such as a feed carriage 11, superposed upon an under carriage or carrier 12. The carrier embodies a portion or housing having a chamber 13, which is open at one side and closed by a cover plate 14, which may be removed to permit access to the interior thereof. A wall of the housing is also shaped to form a tubular portion 15 that has communication, as at 16, with the chamber 13.

The carrier is also provided with a lateral extension 17, which passes below the carriage 11, and is guided at its free end by the carriage, as at 18. A tubular member 19 is arranged in the tubular portion 15, and has a slotted bottom, a portion of which slot registers with the communicating opening 16 between the tubular portion 15 and the chamber 13. Within the tubular member 19, there is provided a feed screw 20 which, when the carrier is reciprocated in any manner (not shown), but well known in this art, is given rotation in any manner, also well known in the art, so as to impart an intermittent step of advancement of the substance holder towards the cutting knife.

Arranged within the housing 13, is a feed nut, which is in the form of a worm gear 21, that projects through the communicating opening between the tubular screw containing member 19 and the chamber 13, to mesh with the threads or worms of the feed screw 20. The nut or gear 21 is supported by a floating clutch member 22, which is of a tapered configuration and fits into a correspondingly tapered central opening 23, through the nut or gear 21. A tapered support 24 is provided for the clutch element 22, and fits into a corresponding opening 25 in the clutch element.

The support 24 is preferably connected to, and supported by a rod 26, which extends under the article carrier, and is in turn mounted for lengthwise sliding movement in a bearing 27, and also in the walls of the housing 13, as at 28 and 28a. Connected to the rod, and within the housing, is a collar or shoulder 29, and the tapered or conical support for the clutch element 22 is slightly eccentric to the opening 25, through the clutch element 22.

Disposed within the chamber 13, is a spring 30, which contacts the cover plate 14 at one end. The other end preferably rests in a recess 31 in the clutch element 22, and tends normally to force the clutch element into the opening 23 in the nut or gear 21 to lock the nut or gear 21 against free rotation, so that when the feed screw 20 is rotated, the nut or gear being held against rotation, will operate to advance the carriage.

Carried by the cover plate 14, is a laterally projecting pin or extension 32, which enters a slot or recess 33 in the clutch member 22, for maintaining it against rotation, but permitting free movement thereof into and out of active or locking position with respect to the nut or gear 21. The spring 30 preferably encompasses the end of the rod 26, and an additional spring 34 is provided for actuating the clutch supporting member 24. This spring encompasses the end of the rod 26, and is eccentrically positioned with respect to the opening 25 in the clutch member.

The collar or shoulder 29 is positioned in proximity to the clutch member 22, so that when the rod 26 is moved longitudinally in one direction, the collar will engage and shift the clutch member against the stress of the spring 30, the collar itself being moved against the stress of the spring 34. When the rod is moved in the opposite direction, the springs will return the respective parts to operative or locking positions.

A control lever 35 is positioned, preferably, at the opposite side of the carrier, and is supported to move about an upright pivot 36. This lever is provided with two spaced opposed projections 37, which co-operate with a pressure plate 38 at the adjacent end of the rod 26, and stops 39 are provided to limit the movement of the lever about its pivot 36.

It is thought that the operation of this improved feed mechanism will be clearly understood from the foregoing, but, briefly stated, it is as follows:

In the normal setting of the parts, the clutch element 22 is pressed by its spring 30, to engage the nut or worm wheel 21, and hold it rigidly against rotation. This clutch element support 24 is urged by its spring 34, to press the clutch and nut or gear 21 toward the feed screw 20, so that the worm wheel or nut 21 is maintained in full mesh with the feed screw, notwithstanding that wear may take place between the nut or worm wheel 21 and the feed screw 20. This action of the clutch support 24 is due to its eccentric arrangement in relation to the central hole 25 through the clutch element 22. If now the feed screw 20 is rotated, the nut or worm gear 21 will function as the usual feed nut. Thus, in operation of the machine, the feed screw receiving its intermittent steps of rotation, will feed the carrier and feed table step by step towards the slicing plane.

The tapers of the opening 23 in the clutch element 22, and of the support 24, are small enough to insure that these parts are non-reactive. That is to say, these parts positively hold the teeth of the worm or nut element 21 is mesh with the feed screw, so that the teeth cannot be forced to ride up the faces of the feed screw threads.

When it is desired to withdraw the carrier or feed table quickly in a return direction, the operator grasps the hand lever 35, and pulls it. This action causes one of the projections 37 to bear against the pressure plate 38, and force the sliding rod 26 in the direction towards the clutch. The collar 29 will bear against the clutch element 22, and displace it sufficiently to relieve the clutch action, but not sufficiently to permit removal of the nut or worm gear 21 from engagement with the feed screw 20.

Thus, the effect of the pull by the operator on the lever 35 is to withdraw the feed table, the worm or nut 21 being rotated idly on the clutch element 22, by the feed screw 20, during this movement.

Likewise, if the operator should desire to advance the feed table or carrier quickly, he may push upon the lever 35. In this event, the other projection 37 bears upon the pressure plate 38, and relieves the clutch.

While the preferred form of the invention has been herein shown and described, it is to be understood that various changes may be made in the details of construction, and in the combination and arrangement of the several parts, within the scope of the claims, without departing from the spirit of this invention.

What is claimed as new is:

1. A slicing machine embodying an article carrier, means for advancing the carrier toward the cutting plane, said means embodying a pinion gear connected to and freely rotatable in both directions with respect to the carrier, a rotating operating worm gear element meshing therewith for rotating the latter, a clutch element rotatably supporting the first said gear and movable into and out of an opening therein, for locking it against rotation with respect to the carrier, and for unlocking it, said clutch element maintaining the gear elements in intermeshed relation, means tending normally to cause the clutch element to lock the first said gear, and means for operating the clutch element against the stress of the last said means to unlock the gear.

2. A slicing machine embodying an article carrier, means for moving the carrier towards the cutting plane, a pinion gear connected to and normally freely rotatable in both directions with respect to the carrier, a rotating operating worm gear element meshing with the first said gear for rotating the latter, a floating clutch element movable into an opening in the first said gear, for supporting it and for bodily adjusting it in a plane transverse to its axis, means tending normally to cause the clutch to lock the last said gear against rotation with respect to the carrier, and means for rendering the clutch element inactive with respect to the co-operating gear.

3. Mechanism for advancing the article carrier of a slicing machine and for releasing the carrier from the advancing means, whereby it may be freely and manually moved independently with respect to the said advancing mechanism, embodying two intermeshing gear elements rotatable about axes in planes that intersect, one of said gear elements being carried by and normally freely rotatable in both directions with respect to the article carrier, a non-rotatable clutch element telescoping into and supporting the last said gear, means tending normally to operate the clutch element to lock the gear against rotation with respect to the article carrier, and means for rendering the clutch element inactive with respect to the last said gear, the said gear elements remaining at all times in intermeshed relation.

4. Mechanism for advancing the article carrier of a slicing machine and for releasing the carrier from the advancing means, whereby it may be freely and manually moved independently with respect to the said advancing mechanism, embodying two intermeshing gear elements rotatable about axes in planes that intersect, one of said gear elements being carried by and normally freely rotatable in both directions with respect to the article carrier, a non-rotatable floating clutch element telescoping into and supporting the last said gear, means tending normally to operate the clutch element to lock the gear against rotation with respect to the article carrier, means for rendering the clutch element inactive with respect to the last said gear, and means for bodily shifting the clutch to bodily shift the gear supported thereby, in a direction transverse to its axis of rotation.

5. Mechanism for advancing the article carrier of a slicing machine and for releasing the carrier from the advancing means, whereby it may be freely and manually moved independently with respect to the said advancing mechanism, embodying two intermeshing gear elements rotatable about axes in planes that intersect, one of said gear elements being carried by and normally freely rotatable in both directions with respect to the article carrier, a non-rotatable floating clutch element telescoping into and supporting said one gear element, and means for bodily shifting said clutch element in a plane transverse to the axis of rotation of the supported gear, the last said means embodying means for rendering the clutch element active and inactive with respect to the said one gear element.

6. Mechanism for advancing the article carrier of a slicing machine and for releasing the carrier from the advancing means, whereby it may be freely and manually moved independently with respect to the said advancing mechanism, embodying two intermeshing gear elements rotatable about axes in planes that intersect, one of said gear elements being carried by and normally freely rotatable in both directions with respect to the article carrier, a floating clutch element telescoping with and supporting said one gear element, means for controlling and for shifting said clutch element and with it the gear supported thereby, in a direction transverse to the axis of the gear, the said means embodying an aperture in the clutch element, an element movable into and out of said aperture, the last said element being disposed slightly eccentric to said aperture, and means for actuating the last said element.

7. Mechanism for advancing the article carrier of a slicing machine and for releasing the carrier from the advancing means, whereby it may be freely and manually moved independently with respect to the said advancing mechanism, embodying two intermeshing gear elements rotatable about axes in planes that intersect, one of said gear elements being carried by and normally freely rotatable in both directions with respect to the article carrier, a tapering floating clutch element telescoping with and supporting said one gear element, means for controlling and for shifting said clutch element and with it the gear supported thereby, in a direction transverse to the axis of the gear, the said means embodying an aperture in the clutch element, a tapering element movable into and out of said aperture, the last said element being disposed slightly eccentric to said aperture, and means for actuating the last said element.

8. Mechanism for advancing the article carrier of a slicing machine and for releasing the carrier from the advancing means, whereby it may be freely and manually moved independently with respect to the said advancing mechanism, embodying two intermeshing gear elements rotatable about axes in planes that intersect, one of said gear elements being carried by and normally freely rotatable in both directions with respect to the article carrier, a floating clutch element telescoping with and supporting said one gear element, means for controlling and for shifting said clutch element and with it the gear supported thereby, in a direction transverse to the axis of the gear, the said means embodying an aperture in the clutch element, an element movable into and out of said aperture, the last said element being disposed slightly eccentric to said aperture, a slidable operating shaft for controlling the last said element, and a pivotally mounted operating handle separate from the shaft and provided with separated portions movable into and out of contact with a portion of the shaft, for shifting the latter.

9. Mechanism for advancing the article carrier of a slicing machine and for releasing the carrier from the advancing means, whereby it may be freely and manually moved independently with respect to the said advancing mechanism, embodying two intermeshing gear elements rotatable about axes in planes that intersect, one of said gear elements being carried by and normally freely rotatable in both directions with respect to the article carrier, a floating clutch element telescoping with and supporting said one gear element, means for controlling and for shifting said clutch element and with it the gear supported thereby, in a direction transverse to the axis of the gear, the said means embodying an aperture in the clutch element, an element movable into and out of said aperture, the last said element being disposed slightly eccentric to said aperture, a slidable operating shaft for controlling the last said element, a pivotally mounted operating handle separate from the shaft and provided with separated portions movable into and out of contact with a portion of the shaft, for shifting the latter, and spaced stops between which said operating handle is movable.

10. A device for advancing the carrier of a slicing machine toward the cutting plane thereof comprising two rotatable intermeshing toothed members, one being a worm gear and the other a pinion gear, locking means for locking the pinion gear against rotation but permitting rotation of the worm gear, means connecting said pinion gear with said carrier whereby rotation of said worm gear will move the carrier when said pinion gear is locked, and means for releasing said locking means and moving said pinion gear without disengaging the gears to permit rotation of both gears, whereby said carrier may be moved independently of the advancing means while said gears remain in intermeshing engagement ADRIANUS van DUYN.

REFERENCES CITED

The following references are of record in the file of this patent:

UNITED STATES PATENTS

| Number | Name | Date |
| --- | --- | --- |
| 376,354 | Ward | Jan. 10, 1888 |
| 1,311,847 | Hood | July 29, 1919 |
| 1,553,864 | Lucey | Sept. 15, 1925 |
| 1,793,359 | Coulson | Feb. 17, 1931 |
| 1,739,697 | Von Berkel | Dec. 17, 1929 |

FOREIGN PATENTS

| Number | Country | Date |
| --- | --- | --- |
| 270,844 | Italy | Jan. 22, 1930 |